T. SPENCER.
PROCESS AND APPARATUS FOR CHARGING STORAGE BATTERIES.
APPLICATION FILED SEPT. 30, 1916.

1,285,319.

Patented Nov. 19, 1918.
5 SHEETS—SHEET 2.

INVENTOR.
THOMAS SPENCER
BY Ira J. Adams
ATTORNEY

UNITED STATES PATENT OFFICE.

THOMAS SPENCER, OF PHILADELPHIA, PENNSYLVANIA, ASSIGNOR, BY MESNE ASSIGN-MENTS, TO NATIONAL CARBON COMPANY, INC., A CORPORATION OF NEW YORK.

PROCESS AND APPARATUS FOR CHARGING STORAGE BATTERIES.

1,285,319.

Specification of Letters Patent.

Patented Nov. 19, 1918.

Application filed September 30, 1916. Serial No. 122,997.

*To all whom it may concern:*

Be it known that I, THOMAS SPENCER, a citizen of the United States, residing at Philadelphia, in the county of Philadelphia and State of Pennsylvania, have invented a certain new and useful Improvement in Processes and Apparatus for Charging Storage Batteries, of which the following is a full, clear, and exact description.

This invention relates to the charging electric storage batteries.

It is well known to those skilled in the art, that about 25% higher voltage is required to charge a storage battery than it will deliver on discharge. In lighting systems employing storage batteries it is therefore necessary to devise some way to protect the lamps from excessive voltage while the battery is being charged, otherwise they would soon burn out.

To accomplish this purpose various schemes have been proposed, such as charging the battery in halves with resistance to take up the excessive voltage of the generator, or in some cases, by counter e. m. f. cells in series with the lamp circuit. The latter is more or less complicated and the former is very wasteful of energy.

It has also been proposed to divide the storage battery set into a plurality of sections and charge a certain number of sections, less than the whole number, at a time, and when these have been charged to a certain extent, say ¼ or ½ full charge, to disconnect one section and add another. In this way the process is continued until the full set is charged. This avoids the loss of energy incident to charging the whole set through a resistance, but it requires an attendant to be present during the charging operation, otherwise the sections will not be uniformly charged.

My invention is also applicable to end cell regulation of storage batteries. In this sort of voltage regulation the individual end cells are necessarily subjected to unequal drains, so that very few of the cells are in the same state of discharge. When charging such end cells it is therefore necessary to give each cell individual attention or else a number will be either undercharged or overcharged. A further object in my invention is therefore to provide an arrangement whereby a bank of end cells will be subjected to the same drain regardless of the number cut in or out in the regulation of the voltage.

I have devised a method and apparatus in connection with it, of charging storage batteries with minimum waste of energy and which does not require the attention of an operator.

Referring to the drawings:

Fig. 8 is a diagrammatic view of a further modified form of controller.

In accordance with my method of charging batteries, the cells are divided into two sections, each tapped in the middle by a conductor, thus making four groups. Three groups are placed in series across the generator terminals, while the fourth is in repose. This will require a charging voltage from the generator approximately equal to the normal voltage of the entire battery. The lamps will therefore receive approximately normal voltage during the charging operation. Instead of charging the first group of three cells to one-third normal charge before substituting a new group for one of the partially charged groups, I have devised apparatus to shift the generator terminals from one group of three to another in rapid succession. The means for accomplishing this purpose will now be explained in detail.

Figure 1:
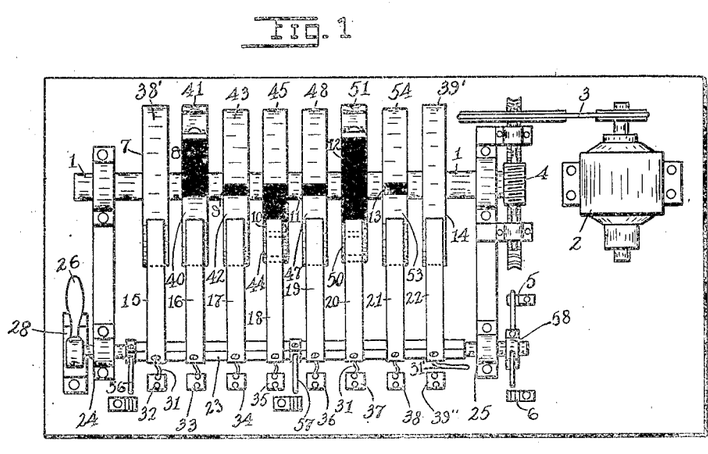
Figure 1 is a plan view of the controller employed in my charging apparatus.
Figure 2:
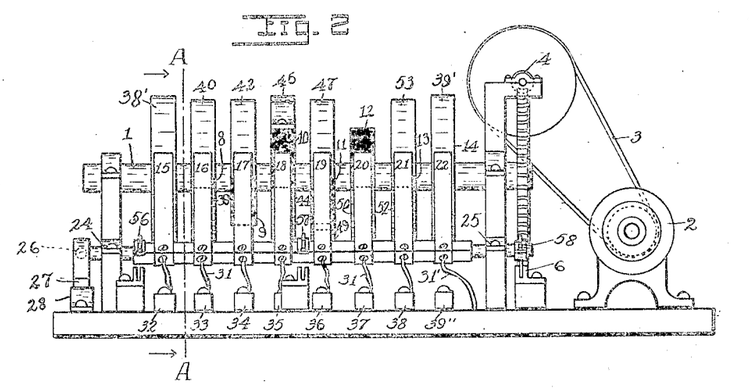
Fig. 2 is an elevation of the controller shown in Fig. 1.
Figure 3:
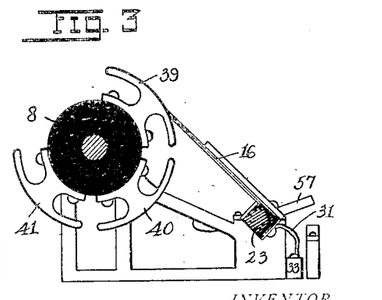
Fig. 3 is a partial sectional view of the controller taken on the line A—A of Fig. 2, looking in the direction of the arrows.
Figure 4:
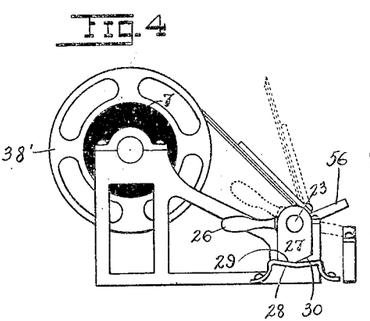
Fig. 4 is an end view of the brush lifting lever.
Figure 5:
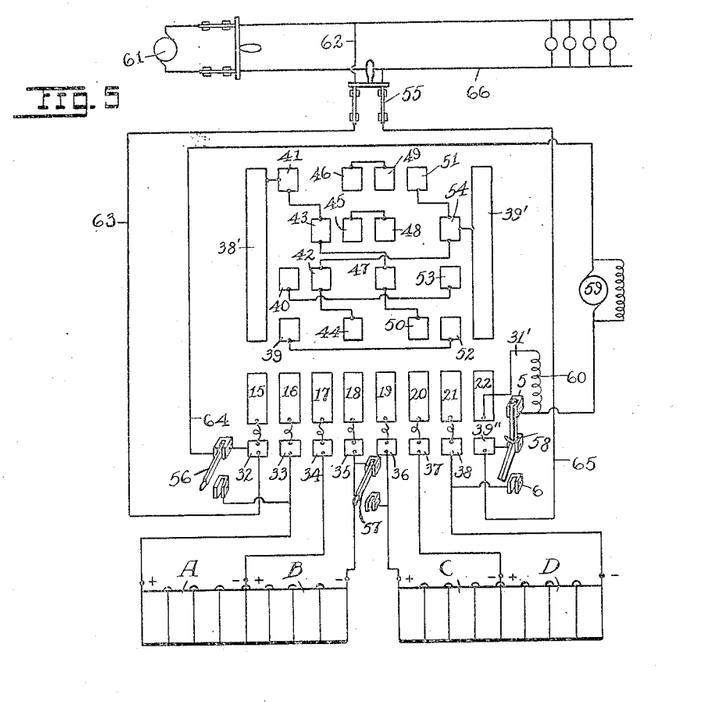
Fig. 5 is a diagrammatic development of the controller with the generator and batteries connected in proper relation.

Referring to the drawings, the controller consists of an axle 1 adapted to be rotated by an electric motor 2 through a belt 3 and worm gear arrangement 4. This axle has a plurality of nonconducting disks carrying a plurality of contacts. In the controller shown there are eight disks 7, 8, 9, 10, 11, 12, 13, and 14, bearing one or more contacts properly spaced around the periphery. Eight stationary brushes, 15, 16, 17, 18, 19, 20, 21 and 22 engage the contacts in certain periods of their rotation to close the circuit in a predetermined way. These brushes (except brush 22) are connected by flexible conductors 31 with their contact blocks 32, 33, 34, 35, 36, 37 and 38 respectively, which in turn are connected up to the proper circuits of the battery groups. Brush 22 is connected by flexible cable 31' to a charging resistance 60 (Fig. 5). The brushes are preferably mounted on a nonconducting shaft 23 which is rotatably secured in bearings 24, 25, so that the brushes can be moved into and out of operative position. To accomplish this purpose, a handle 26 is secured to shaft 23 and a projection 27 thereon engages spring 28, so that the brushes will be held either against the rotating cams, or out of contact therewith, depending upon the position into which the handle is thrown. That is, when it engages face 29 of projection 27 the brushes will be in contact relation, and when it is in engagement with surface 30 the brushes will be thrown out of operative position. Also, attached to shaft 23 are the single pole switches 56, 57, and the single pole double throw switch 58, so that when the handle 26 is in the horizontal position and the brushes are down on their conductors, switches 56, 57 are open and switch 58 is closed on the upper contacts 5 of Fig. 5. When the handle is in the inclined position, the brushes are off their conductors, switches 56 and 57 are closed and switch 58 is closed on lower contacts 6.

The end disks or drums 7 and 14 carry a continuous ring conductor 38' and 39' and are always in contact with brushes 15 and 22 unless the brushes have been thrown out of position by means of the handle 26. The contact drum 8 has three contacts 39, 40 and 41 (Fig. 3) properly spaced apart to prevent the brush 16 from contacting with two at the same time. Drum 9 has only two contacts 42 and 43, while drum 10 has three contacts 44, 45 and 46. Drum 11 likewise has three contacts 47, 48 and 49, while drum 12 has only two contacts 50 and 51. The remaining drum has three contacts 52, 53 and 54.

As will be seen on referring to Fig. 5, contacts 39, 44, 50 and 52 are in alinement with each other in the direction of the axis of rotation of the controller, so that all of these four will be in contact with their brushes during substantially one-fourth of the time or rotation of the controller contacts. The next period of time contacts 40, 42, 47 and 53 will be in contact with their brushes, and during the third period, contacts 43, 45, 48 and 54 will engage their brushes. Finally contacts 41, 46, 49 and 51 during the fourth period, will engage their respective brushes.

The controller will thus be seen to consist of four rows each having four contacts. The connections between these contacts and the slip rings 38' and 39' are as follows: Slip ring 38' is connected by suitable conductors to contact 41 of the upper row (Fig. 5), contact 43 of the second row, contact 47 of the third row and contact 50 of the bottom row. One contact of each row is thus connected to the slip ring 38' which is adapted to be connected with one terminal of the generator 61. In a similar manner contacts 51, 54, 42 and 44 of the other rows are connected with the slip ring 39' which is in turn connected to the other generator terminal through contact block 39'', switch 58, contacts 5, charging resistance 60 and lead 31' to brush 22 which engages the slip ring. The two central contacts 46 and 49 of the top row, as well as the central contacts 45 and 48 of the second two are connected together in order to join the negative terminal of group B of the storage battery with the positive terminal of group C during two of the charging periods. In the third row the two outer contacts 40 and 53, and also the two outer contacts 39 and 52 of the bottom row are connected together to join the positive terminal of group A with the negative terminal of group D during the remaining two periods.

The period of rotation of the controller contacts is such as to switch in or out the battery sets in a relatively rapid manner as compared to known methods where the groups will be maintained in circuits until say a half or a third of a charge has been completed. The exact speed of rotation of the controller contacts in my improvement is not limited to any definite value, but I prefer to have a complete rotation at least once every half-minute. The rapidity of rotation should be such that if the charging is interrupted at any period, no one of the groups will have received a charge appreciably greater than any of the others.

The operation of my controller will now be described. Referring to the diagrammatic illustration of Fig. 5, the batteries are divided up into four groups A, B, C and D, and these are all connected up to certain of the brushes in the circuit controller to accomplish the charging of the battery in sets of three groups. To charge the battery the handle 26 is thrown into the horizontal position (Fig. 4) which brings the brushes in engagement with their respective contacts on the rotatable disks, opens switches 56 and 57 and closes switch 58 in the "up" position (Fig. 5). Then, as soon as main switch 55 is closed the motor starts to rotate the controller arrangement and the charging begins. The circuit of the motor can be traced from charging generator 61, lead 62, switch 55, wire 63, terminal block 32, wire 64, motor 59, terminal 39'', wire 65, switch 55, back to generator lead 66. The contacts will be in engagement with the brushes something less than one-fourth of the time taken for a complete revolution, as there must be sufficient insulating space therebetween to prevent the brushes from engaging two contacts at once. However, for purposes of explanation it will be assumed that the brushes are in engagement with the contacts for a quarter of a period of revolution.

The controller having now been set in operation by the rotation of the motor, during the first quarter period of the revolution, current will flow from brush 15, contact ring 38', contacts 41, 43, 47 and 50, to brush 20, terminal 37, through section D of the batteries to terminal 38, brush 21, contacts 52 and 39 and brush 16, terminal 33, through battery groups A and B to terminal 35, brush 18, contacts 44, 42 and 54, contact ring 39', brush 22, lead 31'; charging resistance 60, switch 58 and terminal 39'', wire 65, back to the generator as previously described. During this quarter period of the revolution, groups D, A and B are being charged.

When the first row of contacts are rotated out from beneath the brushes, the second row of contacts, 40, 42, 47 and 53 are brought into contact position. Current then flows from the generator through contact ring 38', contacts 41, 43, and 47, brush 19, terminal 36, sections C and D of the battery, terminal 38, brush 21, contacts 52 and 40, brush 16, terminal 33, section A of the storage battery, terminal 34, brush 17, contacts 42 and 54, ring 39', brush 22, lead 31', charging resistance 60, and thence to the generator, as previously described. During this quarter period of revolution, sections C, D and A are being charged.

During the third quarter of the revolution, contacts 43, 45, 48 and 54 are brought in engagement with their brushes and the circuit is completed from ring 38', contacts 41 and 43, brush 17, terminal 34, through group B of the batteries to terminal 35, brush 18, contacts 45 and 48, brush 19, terminal 36, through groups C and D, of the batteries to terminal 38, brush 21 and contact 54, to the negative ring 39', brush 22, lead 31', charging resistance 60 and thence to the generator, as previously described. During this quarter period of revolution, groups B, C and D are being charged.

The next quarter period of the revolution, contacts 41, 46, 49 and 51 are brought into engagement with their brushes and circuit is then closed from the positive ring 38' to contact 41, brush 16, terminal 33, through groups A and B of the battery, to terminal 35, brush 18, contacts 46 and 49, brush 19, terminal 36, through group C to terminal 37, brush 20, contacts 51, 54, to negative ring 39', brush 22, lead 31', charging resistance 60, and thence to the generator. During this period, groups A, B and C are under charge. During one complete revolution of the controller, it will be seen that one of the groups has been under charge for three-fourths of the revolution and that three in series have always been connected to the generator, so that the requisite voltage is obtained to charge the batteries without throwing abnormal voltage on the lamps or other translating device.

After having closed the switches to start the controller into operation, it will be permitted to continue any desired length of time. Since the batteries are charged by a constant voltage system the current will taper down gradually and reach a very low value when the batteries are fully charged. The current is so slight at this time that no harm can result by failure to open the circuit. No close attention is therefore required. However, if it is desired to discontinue the charging operation for some reason or other, before the batteries are completely charged, the attendant will open the switch 58 from the position shown in Fig. 4, when the charging operation will cease. To throw the batteries into operative position in regard to the lights, switches 56 and 57 should then be closed and switch 58 thrown into its down position in Fig. 4. All batteries will then be in series and the circuit may be traced through the positive terminal of group A, through group B, switch 57, groups C and D, switch 58, terminal 39'', wire 65, switch 55, through the lamps or other translating device, wires 62 and 63, terminal 32, switch 56, back to the positive terminal of section A.

My improved charging system can be used wherever it is necessary to charge storage batteries, but it is of especial value for isolated installations, such as lighting plants used on farms and in rural communities. It is relatively simple to operate and requires no skilled attendant to oversee its operation during the charging of the battery.

The rapid intermittent charging of the cells not only is advantageous from the standpoint of practical operation, but it is also beneficial as it gives a period of open circuit for the equalizing of the acid strength in the vicinity of the plates, and also for equalizing the charge taken by the individual plates through interdischarge.

While I have described a certain order in which the groups are charged, it will be apparent that various other orders may be followed and also there may be more or even less than four groups, though four are preferable. In its broadest aspect the invention consists in dividing the batteries into a plurality of groups and charging a certain number of groups for a relatively short time, then adding additional ones while removing others and again charging for a short period, and thus continuing in a cycle wherein the groups are in and out of circuit for short periods of time. It will therefore be evident that the benefits of brief intermittent charges can be obtained in a variety of ways included in the scope of the invention.

Figure 6:
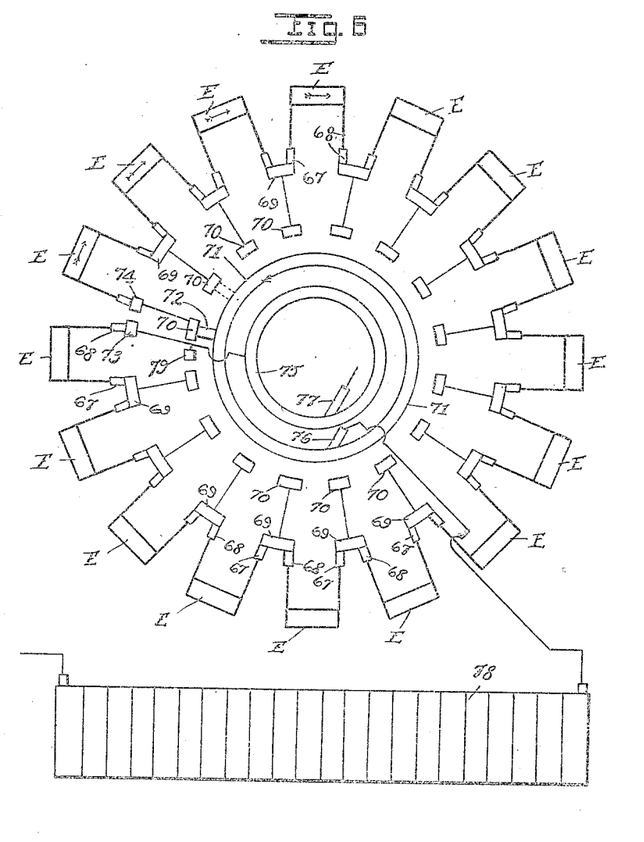
Figs. 6 and 7 are modified forms of the controller.
Figure 7:
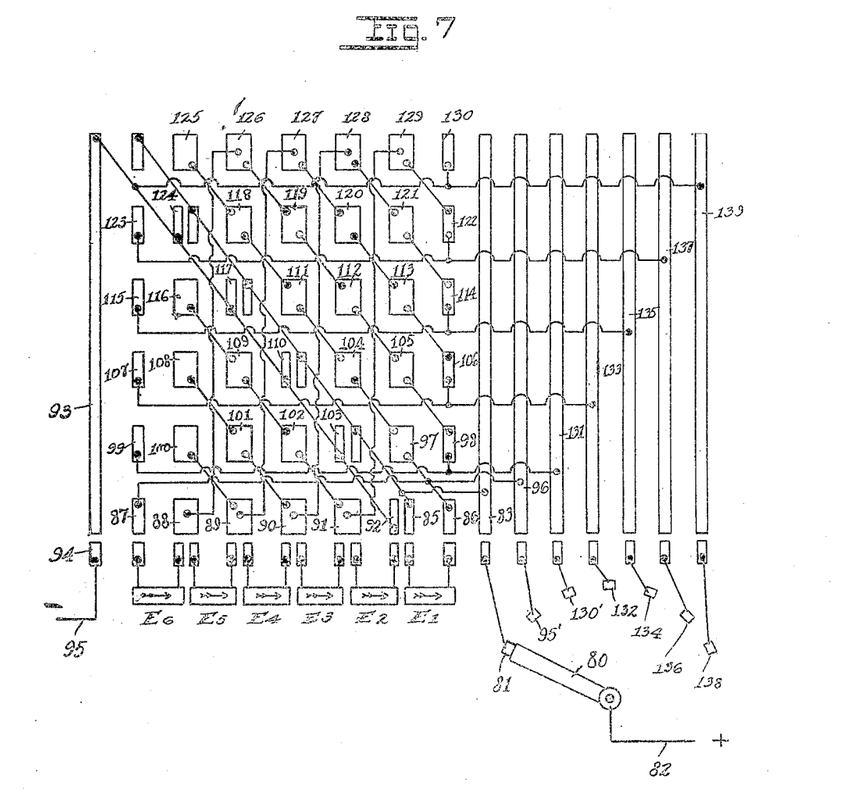
Figure 9:
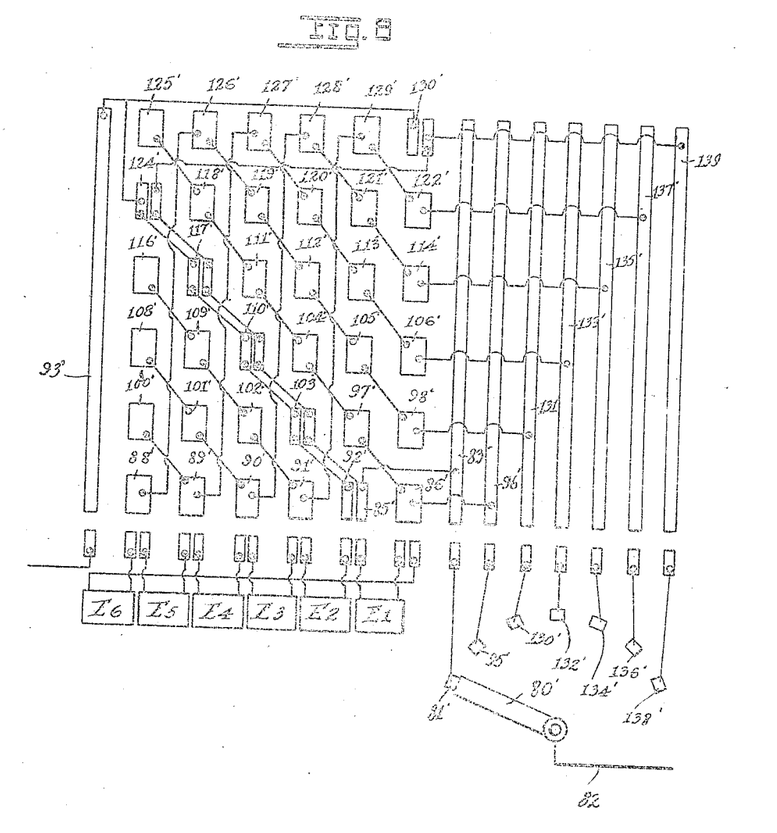

Modifications of the invention shown in Figs. 6, 7 and 8 are adapted for end cell regulation. To simplify matters the arrangement is shown more or less diagrammatically.

In Fig. 6 a plurality of cells E are connected to insulated contacts 67, 68 which are adapted to be engaged by rotating contacts 69 in a manner to be described later. Each of the contact strips 69 is connected to a second strip 70, any one of which can be connected to a slip ring 71 by an adjustable switch block 72 which may be moved by any well known means. Instead of having all of the outer rotating contacts of a solid block of metal 69, two contacts 73, 74 are provided. Contact 74 is connected to one of the segments 70 in the same manner as has been described in connection with contact 69. Contact 73, however, is connected directly to a slip ring 75. Brushes 76, 77 contact with the slip rings 71 and 75. One of the brushes, say brush 76, is connected to one of the terminals of the storage battery set 78 whose voltage is to be raised or lowered by the end cell arrangement. The other brush is connected to the translating device (not shown). However, the batteries E can be regarded as the entire set, any one of which can be cut out or in as an end cell. In other words, all the batteries can be connected to the controller instead of connecting only the end cells.

The operation of the end cell system is as follows. End cells E, as well as their contacts 67, 68 are stationary while all of the other parts rotate together excepting, of course, the brushes 76, 77. When the contact arm 72 has been adjusted to connect the contact block 70 with the slip ring 71 as shown in the drawing, all of the end cells are in series with the battery 78 so that the voltage of the set is boosted or raised an amount equal to the sum total of the voltage of the end cells. However, these end cells have the current rapidly interrupted by the rotating mechanism, as the contacts 69 pass from one set of battery terminals to another. In this connection it must be said that the contacts 69 are long enough to connect one battery terminal with the adjacent one, but are not long enough to connect together the two contacts of any one battery.

If the voltage of the battery rises due to a decrease in the load, switch contact block 72 will be moved clockwise to engage another of the contact blocks 70 as shown in dotted lines. There are then only 15 end cells in the circuit, but there is no one cell cut out of the circuit entirely. Each of the 16 cells are placed in circuit during $\frac{15}{16}$ of the revolution of the contacts and out of circuit for $\frac{1}{16}$ of a revolution. If the contact arm were moved to join the next segment 70 with the slip ring 71, only 14 of the cells would be in circuit at any one time, each of the 16 cells, however, being in circuit for $\frac{7}{8}$ of a revolution and out of circuit for the remaining $\frac{1}{8}$ of the revolution.

The contact block 72 can thus be moved around to decrease the number of cells to be in circuit at any given time, while distributing the drain equally over the full set of end cells. If the block be moved until it engages block 79, all of the end cells will be cut out. It will be understood that by moving the arm in the reverse direction any given number of cells can be cut in in a way similar to what has just been described.

In Fig. 7 I have disclosed the controller system somewhat similar to that shown in Fig. 5 of the charging scheme. The operation of this controller will now be described as briefly as possible without sacrificing clearness.

When the contact arm 80 is in engagement with the first contact 81, the current will flow from line 82 direct to slip ring 83, to contact 85, through end cell $E^1$, contact 86 through the horizontal connection to contact 87, end cell $E^6$, contact 88, end cell $E^5$, contact 89, end cell $E^4$, contact 90, end cell $E^3$, contact 91, end cell $E^2$, contact 92, through the diagonal connection direct to slip ring 93, brush 94, line 95, to the storage battery set whose voltage is being raised or lowered. With the arm in this position it will be seen that all of the end cells are in circuit and the sum total of their voltage is being added to the battery set under regulation. It must be understood that the controller contacts and slip rings are being rotated in the same manner as described in connection with the charging set shown in Figs. 1, 2, 3, 4 and 5. The brushes joined to the end cell terminals make a brief contact with the contacts 85 to 92 inclusive and then engage the next row of contacts shown above them in the diagrammatic illustration.

When contact arm 80 engages contact 95′ the circuit can be traced as follows: Line 82 through the controller to ring 96, through the horizontal connection to contact 87, through $E^6$, contact 88, $E^5$, contact 89, $E^4$, contact 90, $E^3$, contact 91, $E^2$, contact 92, diagonal connection direct to slip ring 93 and on out as previously described. It will thus be seen that in this position cell $E^1$ is cut out. Therefore the storage battery set under regulation is boosted by the voltage of five cells only.

With the contact arm still in engagement with contact 95′, and supposing the controller to rotate until the second row of contacts are in engagement with the brushes attached to the end cell terminals, the circuit can be traced to slip ring 96 and thence to contact 97, end cell E¹, contact 98, through horizontal connection to contact 99, E⁶, contact 100, E⁵, contact 101, E⁴, contact 102, E³, contact 103, through the diagonal connection to slip ring 93 and out as before. In this position E² has been cut out.

With the controller arm 80 still in engagement with the contact 95′ the next instant the third line of controller contacts will engage the end cell brushes and circuit can be traced to contact 104, end cell E², contact 105, E¹, contact 106, through horizontal connection to contact 107, E⁶, contact 108, E⁵, contact 109, E⁴, contact 110, through the diagonal connection to slip ring 93 and out as before. In this position end cell E³ is idle.

The next instant the fourth row of contacts are in engagement with the end cell brushes and circuit can be traced from slip ring 96 through the diagonal connection through contact 111, end cell E³, contact 112, end cell E², contact 113, E¹, contact 114, horizontal connection to contact 115, end cell E⁶, contact 116, end cell E⁵, contact 117, through the diagonal connection and out to slip ring 93. In this position E⁴ will be cut out.

The fifth row of controller contacts next come into engagement with the end cell brushes and circuit may be traced through the diagonal connection to contact 118, end cell E⁴, contact 119, E³, contact 120, E², contact 121, E¹, contact 122, horizontal connection to contact 123, E⁶, contact 124, through the diagonal connection to slip ring 93. In this position E⁵ has been cut out.

The next instant the top row of contacts engages the end cell brushes and circuit may be traced through the diagonal connection to contact 125, E⁵, contact 126, E⁴, contact 127, E³, contact 128, E², contact 129, E¹, contact 130, through the horizontal connection to slip ring 93. In this position end cell E⁶ has been cut out.

It will be seen from the foregoing description that with the controller arm on contact 95′, only five of the end cells are in circuit at any one time, and yet each one of the six end cells is in circuit for ⅚ of the time taken for the revolution of the controller, that is, not taking account of the brief time that all of the cells are on open circuit due to the brushes passing from one row of contacts to another.

When the arm 80 is on contact 130′ circuit may be traced to slip ring 131 through diagonal connection to contact 126, vertical connection to contact 88, end cell E⁶, contact 89, E⁴, contact 90, E³, contact 91, E², contact 92 to slip ring 93 through the diagonal connection. With the arm in this position it will be seen that two of the end cells, namely E¹ and E⁵, are cut out. It will unduly prolong the specification to trace out the circuits for all of the rows of contacts, as the controller rotates, but it will be apparent that while the arm is in engagement with contact 130′, only four of the cells will be in contact at any one time, yet at the same time each of the six cells will be in circuit the same length of time during each complete revolution. Likewise their periods of repose will be equal.

When the arm is in engagement with contact 132 circuit may be traced to slip ring 133, to contact 106, diagonal connection, to contact 127, vertical connection, to contact 89, end cell E⁴, contact 90, E³, contact 91, E², contact 92, diagonal connection to the slip ring 93. In this position only three of the end cells are in circuit at any one time, yet as the controller rotates the drain is distributed over the entire six.

When the contact arm 80 is in engagement with contact 134, circuit may be traced to slip ring 135, to contact 114, diagonal connection to contact 128, vertical connection to contact 90, end cell E³, contact 91, end cell E², contact 92 and out through the diagonal connection to slip ring 93. In this position only two of the cells are in circuit at any one time and as the controller rotates the drain is distributed over the entire six cells, as previously described. When the contact arm is in engagement with contact 136, circuit can be traced to ring 137, contact 122, contact 129, contact 91, end cell E², contact 92, and out to slip ring 93, only one cell being in circuit.

When the contact arm is in engagement with contact 138, circuit may be traced to slip ring 139, horizontal connection to slip ring 93. In this position all of the end cells are cut out no matter which row of contacts are engaging the end cell brushes.

From what has been described in connection with Figs. 6 and 7, it will be seen that I provide for end cell control of storage battery voltage without unequally discharging any of the end cells. Consequently all of the end cells can be connected up together for charging and allowed to remain on charge for an equal period.

If desired the cells of the entire storage battery may be connected up to the controller in Fig. 7, instead of connecting only the end cells. When this is done the last slip ring 139 may be omitted. This ring permits all the cells being cut out and obviously such would not then be required although it could be used if desired.

In Fig. 8 the vertical row of small contacts on the left of Fig. 7 have been transferred to the right. It will be apparent that this can be done as the two outside circumferential rows of small contacts are joined together in Fig. 7. When this change is made the extreme left hand brush is moved over to the right and joined to the battery by a suitable conductor. Each part in Fig. 8 is lettered similarly to that in Fig. 7 and a detail description of the former is unnecessary.

In Fig. 8 there are $n$ batteries having terminals connected to brushes and $n$ linear (horizontal) rows of contacts arranged in $n$ circumferential (vertical) rows. There are also $n-1$ large contacts in each row, both linear and circumferential, adapted to engage two of the brushes and two small contacts in each row, both linear and circumferential. There are also two terminal slip rings each connected to a small contact in each row, both linear and circumferential, and a plurality of additional slip rings each connected to a large contact in each row. The number of these additional slip rings used will depend upon the purpose. If all cells are subject to being cut out, as would probably be the case when all the cells are end cells, then $n$ additional slip rings will be needed. However, if the batteries (six in number in Fig. 8) are looked upon as the entire set (main cells plus end cells) then as many additional slip rings will be needed as there are end cells to be cut out. In Fig. 8 if only one of the cells is to be cut out, there would be one additional ring. If two are thus subject, there would be two such rings.

It will be apparent that the controllers shown in Figs. 7 and 8 can be used either for regulation or for charging. In other words these controllers will perform in the same way regardless of whether the charging or the discharging method is being followed.

It will also be apparent that all the controllers can be constructed for any number of batteries without departing from the spirit of the invention.

The controller shown in Fig. 6 is likewise capable of use in carrying either the charging or discharging method. It is also capable of use with any number of batteries. In this controller there are $n$ batteries and $n-1$ large contacts adapted to join adjacent brushes with a pair of small contacts adapted to contact with (but not join) adjacent brushes as the controller is rotated.

Having described my invention, what I claim is:

1. In storage battery charging apparatus, a plurality of rotatable contacts, a pair of switches adapted to connect the mains to the batteries, a plurality of brushes connected to the batteries and means for moving the brushes against the said contacts and simultaneously opening said switches.

2. In storage battery charging apparatus, a plurality of rotating disks having contact segments, a rotatable shaft, a plurality of brushes on said shaft and a pair of switches adapted to connect the batteries to the mains, said switches being connected to said shaft and positioned to be opened or closed when said brushes are on or off said segments respectively.

3. In battery charging apparatus, a generator, a storage battery set divided into two sections provided with terminals and middle posts, brushes connected to the terminals and middle posts, a plurality of contacts adapted to engage the brushes, and means for rotating the contacts.

4. In battery charging apparatus, a generator, a storage battery set divided into two sections provided with terminals and middle posts, a switch for connecting the battery sections in series, brushes connected to the terminals and middle posts, a plurality of contacts adapted to engage the brushes and means for rotating the contacts.

5. In battery charging apparatus, a generator having brushes connected to its terminals, a storage battery set divided into two sections provided with terminals and middle posts, a pair of brushes, additional brushes connected to the terminals and middle posts, a switch for connecting said battery sections in series, a pair of slip rings adapted to engage said first mentioned brushes, a plurality of contacts adapted to engage the second mentioned brushes and means for rotating the slip rings and contacts.

6. In battery charging apparatus, a generator having two terminals, a storage battery set divided into two sections having terminals and intermediate posts, a conducting member connected to each generator terminal through the charging operation, brushes connected to the battery terminals and posts, a plurality of rows of contacts adapted to engage said brushes, said members being connected to certain of said contacts, and means for causing relative movement between the brushes and rows of contacts.

7. In battery charging apparatus, a generator having two terminals, a storage battery set divided into sections having terminals and intermediate posts, a conducting member connected to each generator terminal throughout the charging operation, brushes connected to the battery terminals and posts, a plurality of rows of contacts, said members being connected to certain of said contacts, a conductor connecting a contact in one row with a contact in another row, and means for causing relative movement between the brushes and rows of contacts.

8. In battery charging apparatus, a generator, a storage battery set consisting of two sections each having positive and negative terminals and an intermediate post, conducting members connected to the generator terminals throughout the charging operation, brushes connected to the battery terminals and intermediate posts, a plurality of rows of contacts, conductors for connecting contacts with said conducting members, a conductor for connecting a contact in one row with a contact in another row, a conductor for connecting together two contacts in the same row, and means for causing the brushes to successively engage the rows of contacts.

9. In battery charging apparatus, a generator, a storage battery set divided into two sections having terminals and middle posts, a conducting member connected to each generator terminal throughout the charging operation, brushes connected to the battery terminals and posts, a plurality of rows of contacts, conductors connecting each of said conducting members with one contact, conductors connecting each of said last mentioned contacts with a contact in another row, a conductor connecting together two contacts in the same row and means for rotating said rows of contacts whereby the brushes successively come into engagement therewith.

10. In battery charging apparatus, a generator, a storage battery set divided into two sections having terminals and intermediate posts, a conducting member connected to each generator terminal throughout the charging operation, brushes connected to the battery terminals and the posts, a plurality of rows of contacts, a conductor connecting a contact with each of said conducting members, means for connecting each of said last mentioned contacts with a contact in the other rows, and means for rotating said rows of contacts whereby the brushes successively engage therewith.

11. In battery charging apparatus, a generator, a storage battery set divided into two sections having terminals and middle posts, conducting members connected to the generator terminals throughout the charging operation, brushes connected to the battery terminals and posts, a plurality of rows of contacts, means for connecting a contact in each row with one of said conducting members, means for connecting another contact in each of said rows with the other conducting member, a conductor for connecting together two contacts in the same row, and means for causing relative movement between the brushes and rows of contacts.

12. In battery charging apparatus, a generator, a storage battery set divided into two sections having terminals and middle posts, conducting members connected to the generator terminals throughout the charging operation, brushes connected to the battery terminals and posts, a controller having four rows each containing four contacts, means for connecting a contact in each row with one of said conducting members, means for connecting a second contact in each row with the other conducting member, a conductor connecting together the remaining two contacts in each row, and means for rotating the contacts.

13. In a battery charging apparatus, a generator, a storage battery set divided into two sections having terminals and intermediate posts, conducting members connected to the generator terminals throughout the charging operation, a charging resistance connected between one of the terminals of said generator and one of the conducting members, brushes connected to the battery terminals and posts, a plurality of rows of contacts, and means for causing the brushes to successively engage the rows of contacts.

14. In battery charging apparatus, a generator, a storage battery set divided into two sections having terminals and intermediate posts, a slip ring connected to each of the generator terminals, a plurality of rows of contacts, brushes connecting said slip rings and contacts to said generator terminals, battery terminals, battery terminals and middle posts, and means for rotating the slip rings and contacts.

15. In battery charging apparatus, a generator, a storage battery set divided into two sections having terminals and intermediate posts, a pair of slip rings, a plurality of rows of contacts, a supporting shaft, a plurality of brushes mounted on said supporting shaft and adapted to engage said slip rings and contacts, means for connecting a brush to each generator terminal, battery terminal and middle post, and means for causing the brushes to successively engage the rows of contacts.

16. In battery charging apparatus, a generator, a storage battery set divided into two sections having terminals and intermediate posts, a pair of slip rings, a plurality of rows of contacts, an insulating support for mounting said slip rings and contacts, brushes connected to the generator terminals, battery terminals and posts and adapted to engage the slip rings and contacts, and means for rotating the support whereby the brushes successively engage the rows of contacts.

17. In battery charging apparatus, a generator, a storage battery set divided into two sections having terminals and middle posts, slip rings, a plurality of rows of contacts, a support for mounting said slip rings and contacts thereon, brushes connected to the generator terminals, battery terminals and posts, and a motor connected across the terminals of the generator and adapted to rotate said support.

18. In battery charging apparatus, a generator, a storage battery set divided into two sections having terminals and middle posts, slip rings, a plurality of rows of contacts, an insulating support for mounting said slip rings and contacts thereon, means for rotating said support, a plurality of brushes connected to the generator terminals, battery terminals and middle posts, a movable shaft for mounting said brushes thereon, and a switch blade mounted on said insulating shaft adapted to connect and disconnect one of said slip rings from the generator terminal.

19. In storage battery charging apparatus, a battery divided into a plurality of groups, a plurality of rotatable contacts, a plurality of brushes, means for moving said brushes into engagement with said contacts, a conductor connected to one of the mains and to one of said brushes, a second conductor connected to the other of the mains and to one terminal of a movable switch, a charging resistance connected to a brush and to the other terminal of said switch, and means connecting the terminals of the groups with the remaining brushes.

20. In battery charging apparatus, a generator, a storage battery set divided into two sections having terminals and middle posts, a pair of slip rings, a plurality of rows of contacts, a rotatable support for mounting said slip rings and contacts thereon, a plurality of brushes connected to the generator terminals, battery terminals and middle posts, a rotatable insulating shaft for mounting said brushes thereon, a switch blade on said shaft adapted to connect a terminal of a battery section with a generator terminal, a second switch blade on said shaft adapted to connect a terminal of the other section with the remaining terminal of the generator and a third switch on said shaft adapted to connect the remaining battery terminals together.

21. In battery charging apparatus, a pair of brushes, a conductor connecting the generator mains to one of said brushes, a conductor connecting the other of the mains to a switch block, a charging resistance connected to the second of said brushes, means for connecting said block with said resistance, a storage battery set divided into two sections, additional brushes connected to the terminals and middle posts of said sections, a switch for connecting said sections in series, switches for connecting the terminals of said battery sets to said mains, slip rings adapted to engage said first and second mentioned brushes, a plurality of contact segments adapted to engage said additional brushes and means for rotating the slip rings and contact segments.

22. In battery charging apparatus, a generator, a storage battery set divided into two sections having terminals and intermediate posts, a pair of slip rings, a resistance adapted to be connected between one of said slip rings and one of the generator terminals, a plurality of rows of contacts, an insulating support for mounting said rings and contacts thereon, a motor connected across the generator terminals for rotating said support, a plurality of brushes connected to the generator terminals, battery terminals and middle posts, a rotatable insulating shaft for mounting said brushes thereon, a switch blade for connecting a terminal of one section with one lead of said generator, a second switch for connecting a terminal of the other section to the other generator terminal, a third switch for connecting the two battery sections in series, and a fourth switch adapted to disconnect said motor.

23. In storage battery charging apparatus, a storage battery set divided into two sections, a plurality of rotatable disks having contacts, a rotatable shaft, a plurality of brushes on said shaft and adapted to be placed on or off said contacts by rotating the shaft, a pair of switches adapted to connect the batteries to the mains and a third switch adapted to connect said sections in series, all of said switches being fastened to said shaft and positioned to be opened or closed when said brushes are on or off said contacts respectively.

24. In storage battery charging apparatus, a generator, a storage battery set divided into two sections, a plurality of disks having contacts, a motor connected to the terminals of the generator, a rotatable shaft, a plurality of brushes on the shaft and adapted to be placed on or off said contacts by rotating said shaft, a pair of switches adapted to connect the batteries to the mains, a third switch adapted to connect said sections in series, all of said switches being fastened to said shaft and positioned to be opened or closed when said brushes are on or off said contacts respectively, a charging resistance, and a fourth switch adapted to disconnect said motor from the generator.

In testimony whereof I hereunto affix my signature.

THOMAS SPENCER.